Figure 1:
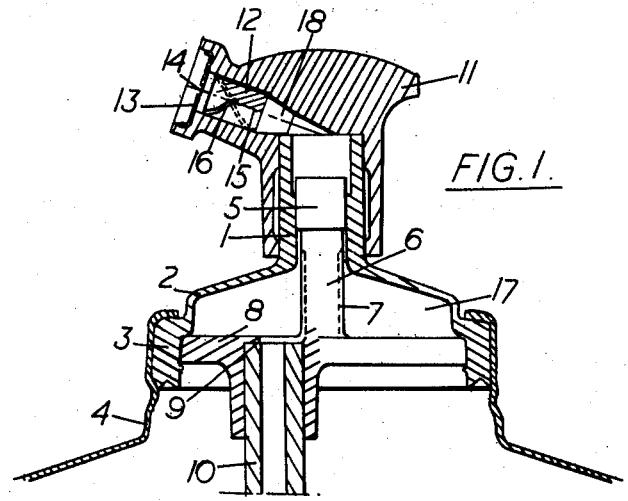

United States Patent Office 3,076,609
Patented Feb. 5, 1963

3,076,609
SPRAY DISCHARGE VALVES FOR ATOMISING RECEPTACLES
Ferdinand Stocker, Venissieux (Rhone), France, assignor to Societe des Usines Chimiques Rhone-Poulenc, Paris, France, a French body corporate
Filed Jan. 30, 1961, Ser. No. 85,529
Claims priority, application France Feb. 1, 1960
2 Claims. (Cl. 239—579)

This invention concerns spray discharge valves for receptacles which are intended to contain products dissolved or mixed in a liquefied gas under pressure and which are known as "atomising receptacles."

The valve construction usually employed comprises a number of metal members, including a spring for controlling the opening and closing of the valve. In such valves, it is necessary to use a number of rubber packings; the manufacture of the valves involves delicate operations and the valves are not always entirely satisfactorily fluid-tight.

In another type of valve used for atomising receptacles, the spring is dispensed with, the opening of the valve being effected by pressure exerted on a deformable resilient wall which in turn acts on the valve seat and on the valve member itself.

In one construction of this type of valve, the component parts are formed of a plastics material, these parts being:

(1) A valve body having an internal seat to receive a valve head;
(2) A frusto-conical disc fitting into the lower part of the valve body and provided with an abutment for fixing the stem of a valve member and formed with orifices for the passage of the liquid contained in the receptacle;
(3) A valve member having a spherical head at the seat end and a stem which is cut away at its lower end and fits into the frusto-conical disc; and
(4) A cap comprising a flange, which serves as a bearing member for the manipulation of the valve and which is formed with a central capillary orifice, which is calibrated to give the required spray.

This construction suffers from a number of disadvantages. It must be made with a high degree of precision and its parts must be very accurately fitted. In addition, due to the spherical form of the head of the valve member, the fluid-tightness afforded with an acute angle of contact between the head of the valve member and the internal seat of the valve body is not always completely satisfactory, minute cavities or fine grooves or ridges being formed in the surface of the plastics material during its moulding.

It is an object of this invention to provide a new or improved valve which is formed of a plastics material and is of a simpler construction than that of the known types of valve.

According to this invention, there is provided a spray discharge valve for atomising receptacles, such valve being formed of a plastics material and comprising a valve body, which is adapted to be secured in an aperture in an appropriate receptacle and has a flexible resilient diaphragm carrying a tube provided with an internal cylindrical surface forming a valve seat, and a valve member which is carried by the valve body and is in the form of a piston comprising a stem carrying a cylindrical head coaxial with, and gripped in fluid tight fashion by, the said valve seat provided by the cylindrical surface in the tube of the valve body, the arrangement being such that the said tube is axially displaceable relatively to the head of the valve member by flexing of the said diaphragm to disengage the head from the seat and open a fluid passage through the tube.

Figure 2:
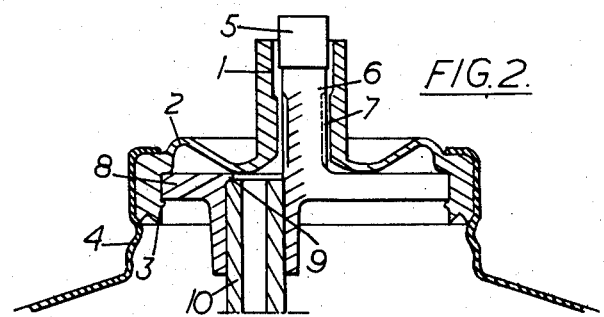
Figure 3:
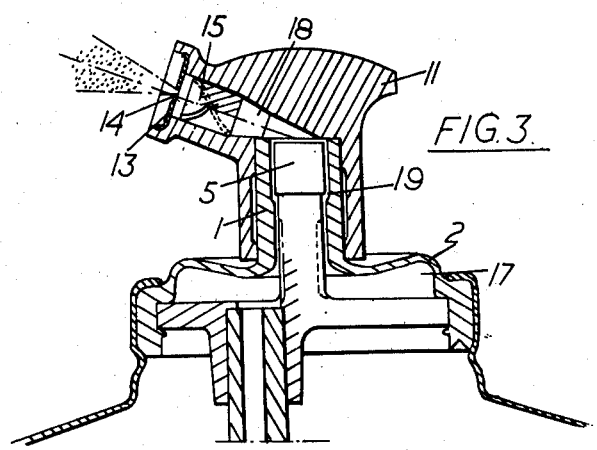
Figure 4:
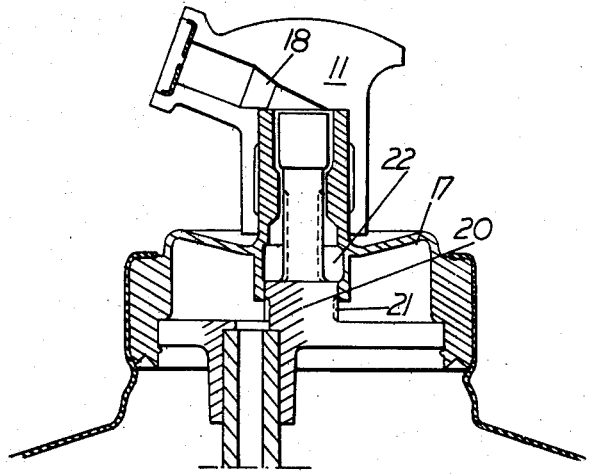
Figure 5:
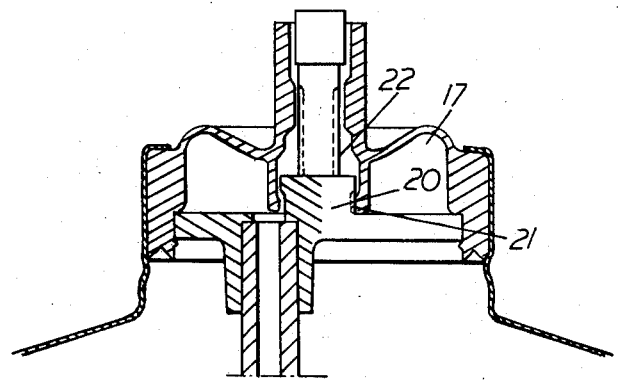

In order that this invention may more readily be understood, two embodiments of valve according to the invention will now be described by way of example with reference to the accompanying drawings, in which:

FIGURE 1 is a fragmentary vertical section through a receptacle provided with a valve according to this invention, such valve being shown in the closed position;
FIGURE 2 is a similar view showing the valve in condition for filling of the receptacle;
FIGURE 3 is a similar view showing the valve in operation for discharge of spray from the receptacle;
FIGURE 4 is a fragmentary vertical section through a receptacle provided with the second embodiment of valve according to this invention, the valve being shown in operation for discharging spray from the receptacle; and
FIGURE 5 is a similar view showing the valve in condition for filling the receptacle.

Referring to FIGURES 1 to 3, the valve there illustrated comprises in the main two elements, each formed of a plastics material, preferably a polyamide, such elements being:

(a) A valve body moulded in one piece and comprising a cylindrical resilient nozzle tube 1, which forms the upper part of the body and is recessed at its upper end, a thin deformable diaphragm 2, which forms an intermediate part of the body and has substantially the shape of a flattened frustum of a cone, and a lip which forms the lower part of the body and is intended to form a packing between the valve body and the receptacle (of which only the upper part is shown in the figure). This lip 3 is maintained in position on the receptacle by any appropriate means in common use, for example by simple crimping of the neck 4 of the receptacle, if the latter is formed of metal; and (b) A piston serving as a valve member, which is also moulded in one piece and comprises a cylindrical head 5 carried by a stem 6, which is of slightly smaller diameter than the tube 1 and the surface of which is formed with one or more longitudinal grooves 7 extending from the lower end of the stem to a position spaced from the said head, the said grooves being intended, as will hereinafter be described, to facilitate the filling of the receptacle, a flange 8 of suitably circular form in plan, which is a forced fit in a recess formed in the lip 3 of the valve body, the said flange 8 being formed with an eccentric downwardly extending boss having therein a bore to receive a dipping tube 10, the bore in the boss extending completely through the flange 8, but being reduced at the upper surface of the flange to provide an abutment 9 against which the upper end of the tube 10 engages.

The dimensions of the various parts may vary in accordance with the size required for the valve, but are chosen such that, in the absence of stress, the nozzle tube 1 grips the head 5 of the valve member as indicated in FIGURE 1, and that, under the action of an external downwardly applied pressure on the nozzle tube 1, the head 5 may be freed as indicated in FIGURE 2 so that the grooves 7 and the small annular space between the stem 6 and nozzle tube 1 form a passage for liquid through the latter. The clearances provided for the passage of the liquid may vary in size in accordance with the viscosity of the mixture to be atomised.

This assembly is surmounted, as in conventional devices, by a cap 11 which is also formed of a plastics material and is fitted on to the nozzle tube 1 of the valve body and formed with a cylindro-frustoconical duct 12 on to the outlet end of which there may be fitted a diaphragm 13 formed with a central capillary orifice 14, the diameter of which may be chosen as a function of the viscosity of the liquid to be atomised. The axis of the said duct may, if desired, be inclined in relation to the axis of the tube as shown.

In order to obtain a good atomisation, the valve cap may with advantage be provided with a small core 15 which is formed with fine spiral grooves 16 and is force-fitted into the recess 12.

In the valve described, the various parts define two chambers, namely a "fore-chamber" 17, which is deformable owing to its being partly defined by the thin diaphragm 2 of the valve body, and an expansion chamber 18.

A general description of the operation of this valve will now be given to enable the invention to be more readily understood.

The filling of the receptacle provided with the valve is illustrated in FIGURE 2, the cap 11 having been removed. Pressure of the filler (not shown in the figure) downwardly on the valve body, causes a flexure of the diaphragm 2 as far as the flange 8. The grooves 7 in the piston stem 6 and the small annular space between the latter and the nozzle tube 1 then permit the free passage of the liquid under pressure from the filler to the dipping tube 10 and thence to the receptacle. The filling is very rapid owing to the presence of the grooves, which ensure a substantial cross-sectional area for said passage.

As soon as the pressure of the filler on the valve body is released, the diaphragm 2 and nozzle tube 1 return to their initial position as illustrated in FIGURE 1. The liquid under pressure contained in the receptacle then rises through the dipping tube 10 into the fore-chamber 17, the valve member being closed owing to the fact that its cylindrical head 5 is held within the nozzle tube 1 of the valve body.

The valve provided with its cap 11 is illustrated in the operative position in FIGURE 3. By a simple pressure of the finger on the cap, the diaphragm 2 is flexed and the head 5 of the piston thus becomes disengaged, whereby a passage 19 is created between the head of the piston and the recessed portion of the tube 1. The liquid maintained under pressure in the fore-chamber 17 is then forced into the expansion chamber 18 in the cap 11 and discharged into the atmosphere through the orifice 14 in the diaphragm 13 as a fine spray, the whirling movement of which is improved by the presence of the grooved core 15. As soon as the pressure on the cap is removed, the diaphragm 2 returns to its initial position illustrated in FIGURE 1, and the nozzle tube 1 is applied on to the head 5 of the piston, whereby absolute fluid-tightness is again ensured.

The valve according to the invention may also be designed to operate to provide a dosed amount of spray. Such a valve is shown in FIGURES 4 and 5. The valve in these figures is similar to that previously described with reference to FIGURES 1 to 3, but is modified by the presence of a second piston 20 also formed with grooves 21 and thus creating an intermediate volumetric chamber 22 between the fore-chamber 17 and the expansion chamber 18. In the closed position, the liquefied gas mixture under pressure contained in the receptacle rises through the dipping tube 10 into the fore-chamber 17 and into the chamber 22 which is in communication with the fore-chamber 17. When the cap is depressed slightly, the second piston 20 moves into the nozzle tube and the liquefied gas mixture is isolated in the chamber 22 between the top of piston head 20 and the bottom of piston head 5. Further pressure on the cap to the position illustrated in FIGURE 4, disengages the piston head 5 from the nozzle tube and the liquefied gas mixture in chamber 22 is exposed to the atmosphere. The liquefied gas evaporates and escapes as a gas with the dissolved or mixed product entrained in the form of a fine atomised spray. Consequently, a measured volume of liquid escapes into the atmosphere at each pressure of the cap.

The elements of the valve according to the invention are readily assembled without any packing or intermediate member and without sticking. It is sufficient to engage the head of the piston in the nozzle tube and to push the two members in opposite directions until the flange of the piston takes up a position in the said recess in the lip 3.

The valves thus assembled can be fitted to receptacles of any kind, e.g. formed of metal, plastic, glass, etc., and of any dimensions, by means of any appropriate device, in accordance with known methods. They may be employed to obtain a very fine spray in the form of aerosols, or of products dissolved in a liquefied gas under pressure, notably of solutions of insecticides, of preservative products, and even of perfumes, creams, paints, varnishes or like products.

I claim:

1. A spray discharge valve for atomising receptacles such valve comprising a tube having a cylindrical bore, an internal cylindrical valve seat surface being formed by said bore and a recessed enlargement of said tube bore being provided at one end thereof, a flexible resilient diaphragm of relatively flattened frusto-conical form extending coaxially outwardly from the said tube adjacent the end thereof remote from said recessed end, a thickened peripheral lip to said diaphragm for securing the latter in an aperture in an appropriate receptacle, the said tube, diaphragm and lip being formed of a one-piece moulding of a plastics material, a cylindrical piston head which is of slightly larger diameter than that of the cylindrical valve seat surface whereby said valve seat surface normally grips said head to be fluid tightly engaged therewith, an axially grooved piston stem of small diameter than said piston head and carrying the said head, the grooves in said piston stem extending axially part way towards the piston head, a circular flange carrying the said piston stem and fitted into the said diaphragm lip, the head, stem and flange being formed as a one-piece moulding of a plastics material, the flexibility of the diaphragm and lengths of the said tube and piston stem being such that, on flexing of the diaphragm, to a discharge position the tube is displaced towards the said flange and the piston head passes into the recessed end of the tube, and a hollow cap removably fitted over the said tube and having a capillary discharge orifice, the cap providing a stop normally preventing movement of the diaphragm to a filling position wherein the grooves in said piston stem provide a by-pass passage past the valve seat surface.

2. A spray discharge valve for atomising receptacles, such valve comprising a valve body formed of a plastics material and adapted to be secured in an aperture in an appropriate receptacle, a flexible resilient diaphragm forming part of said valve body, a tube formed of plastics material carried by said diaphragm and having a through bore, a first internal cylindrical valve seat surface provided by a first part of said bore, a second internal cylindrical valve seat surface provided by a second part of said bore axially spaced from the said first part of the latter, the said bore being enlarged adjacent each of said valve seat surfaces, a valve member also formed of a plastics material and carried by said valve body, a piston stem having a cylindrical outer surface and forming part of said valve member, a first cylindrical piston head of slightly greater diameter than said first internal valve seat surface carried by said stem, such head being coaxial with, and engaged in fluid tight fashion within, the said first valve seat surface, a second cylindrical piston head carried by said stem, such second head being coaxial with, and spaced from, the said first head and located adjacent the said second valve seat surface, but not engaged therewith, the second piston head being of slightly greater diameter than said second valve seat surface as to be a fluid tight fit therewith when engaged therein, so that flexure of the said diaphragm displaces the said tube axially relatively to said piston stem to unseat the first valve head from the first valve seat surface and to engage the second piston head in the second valve seat surface, a first set of axial grooves provided in the surface of said piston stem extending from the second piston head part way towards the first piston head, a second set of axial grooves extending, part way along the surface of the second piston head, and a hollow cap removably fitted over the said tube and having a capillary discharge orifice, the cap providing a stop normally preventing movement of the diaphragm to a filling position wherein the first and second sets of grooves provide by-pass passages past the first and second valve seat surfaces respectively.

References Cited in the file of this patent

UNITED STATES PATENTS

| | | |
|---|---|---|
| 2,856,235 | Ward | Oct. 14, 1958 |
| 2,908,479 | Goodspeed | Oct. 13, 1959 |
| 2,949,243 | Raehs et al. | Aug. 16, 1960 |
| 2,962,228 | Abplanalp et al. | Nov. 29, 1960 |